US010674829B2

(12) United States Patent
Pozzi et al.

(10) Patent No.: US 10,674,829 B2
(45) Date of Patent: Jun. 9, 2020

(54) TRAY TABLE ASSEMBLY WITH AUTOMATIC CENTERING DURING STOWAGE

(71) Applicant: B/E AEROSPACE, INC., Wellington, FL (US)

(72) Inventors: Alexander Nicholas Pozzi, Winston-Salem, NC (US); Darryl D. Daniel, Pfugerville, TX (US); Mark W. Foohey, Webberville, TX (US); Samuel C. Scudder, Webberville, TX (US); John C. Horton, IV, Austin, TX (US)

(73) Assignee: B/E Aerospace, Inc., Winston-Salem, NC (US)

( * ) Notice: Subject to any disclaimer, the term of this patent is extended or adjusted under 35 U.S.C. 154(b) by 173 days.

(21) Appl. No.: 15/917,134

(22) Filed: Mar. 9, 2018

(65) Prior Publication Data

US 2018/0279790 A1    Oct. 4, 2018

Related U.S. Application Data

(60) Provisional application No. 62/478,731, filed on Mar. 30, 2017.

(51) Int. Cl.
| *A47C 7/70* | (2006.01) |
| *B60N 3/00* | (2006.01) |
| *B64D 11/06* | (2006.01) |
| *A47B 46/00* | (2006.01) |
| *B61D 37/00* | (2006.01) |
| *A47B 81/00* | (2006.01) |

(52) U.S. Cl.
CPC ............ *A47C 7/70* (2013.01); *A47B 46/00* (2013.01); *B60N 3/002* (2013.01); *B61D 37/00* (2013.01); *B64D 11/0605* (2014.12); *B64D 11/0638* (2014.12); *B64D 11/0646* (2014.12); *A47B 81/002* (2013.01)

(58) Field of Classification Search
CPC .. A47C 7/70; B64D 11/0605; B64D 11/0638; B64D 11/0646; A47B 46/00; A47B 81/002; B60N 3/002; B61D 37/00
USPC ........................................ 312/334.23–334.43
See application file for complete search history.

(56) References Cited

U.S. PATENT DOCUMENTS

| 422,834 | A | * | 3/1890 | Puffer | |
| 2,846,286 | A | * | 8/1958 | Gomersall | A47B 88/919 312/270.3 |
| 2,937,839 | A | * | 5/1960 | Randolph | B42F 15/06 248/276.1 |
| 5,547,247 | A | * | 8/1996 | Dixon | A47C 7/70 297/145 |

(Continued)

*Primary Examiner* — Daniel J Troy
*Assistant Examiner* — Timothy M Ayres
(74) *Attorney, Agent, or Firm* — Clements Bernard Walker

(57) ABSTRACT

A tray table assembly adapted to move to and from a stowed position in a stowage module positioned to one side of a passenger seat. The assembly includes an arcuate rail movably mounted in the stowage module, a tray table mounted on the rail for arcuate movement along the rail between the stowed position and the deployed position relative to the rail, and also mounted on the rail for fore and aft translating movement in the deployed position. The tray table rides on an arcuate rail that permits both deployment and fore and aft movement of the tray table, and automatically centers the tray table during movement toward the stowed position.

19 Claims, 6 Drawing Sheets

(56) References Cited

U.S. PATENT DOCUMENTS

| | | | | |
|---|---|---|---|---|
| 7,178,889 B2* | 2/2007 | Hoshide | ............ | A47B 88/40 |
| | | | | 312/334.7 |
| 7,296,523 B1* | 11/2007 | Yoon | ............ | A47B 95/00 |
| | | | | 108/103 |
| 9,114,879 B2* | 8/2015 | Ligonniere | ............ | B64D 11/06 |
| 9,565,936 B2* | 2/2017 | Chen | ............ | A47B 88/956 |
| 9,708,066 B2* | 7/2017 | Thompson | ............ | B60N 3/002 |
| 10,342,338 B2* | 7/2019 | Foohey | ............ | B64D 11/0638 |
| 10,351,036 B2* | 7/2019 | Foohey | ............ | B60N 3/002 |
| 10,370,107 B2* | 8/2019 | Pozzi | ............ | B64D 11/0605 |
| 2013/0093221 A1* | 4/2013 | Ligonniere | ............ | B64D 11/06 |
| | | | | 297/173 |

* cited by examiner

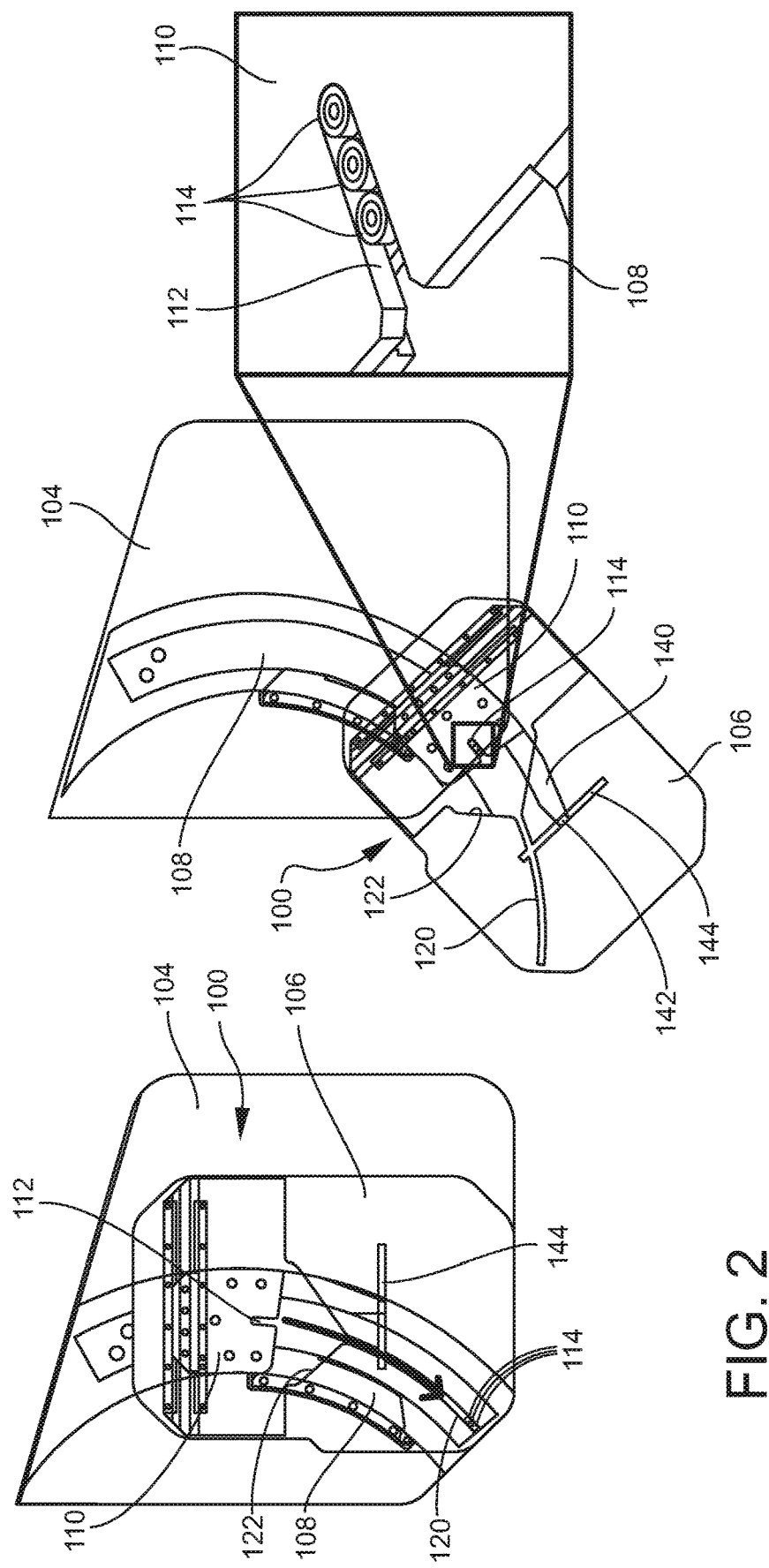

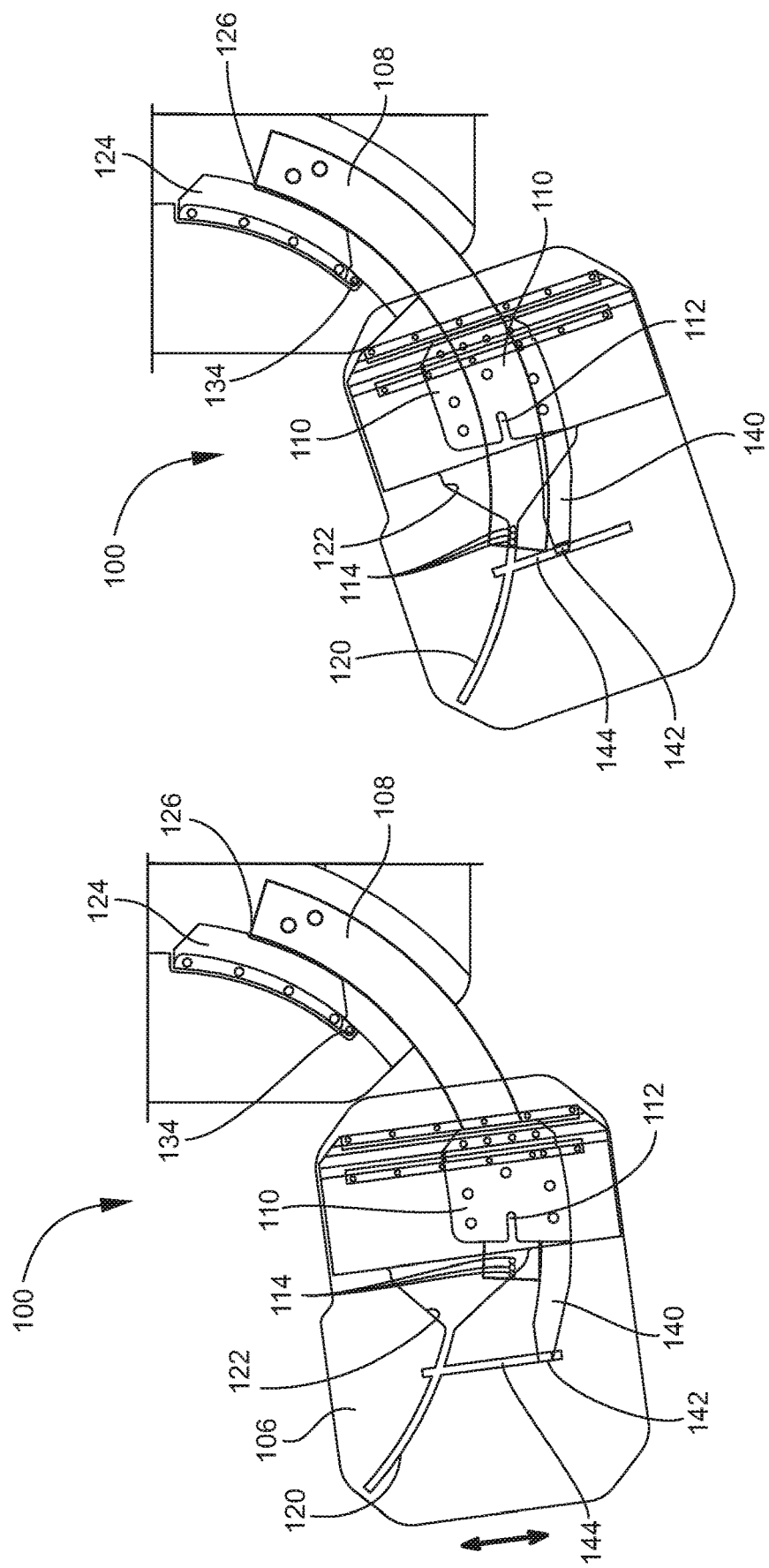

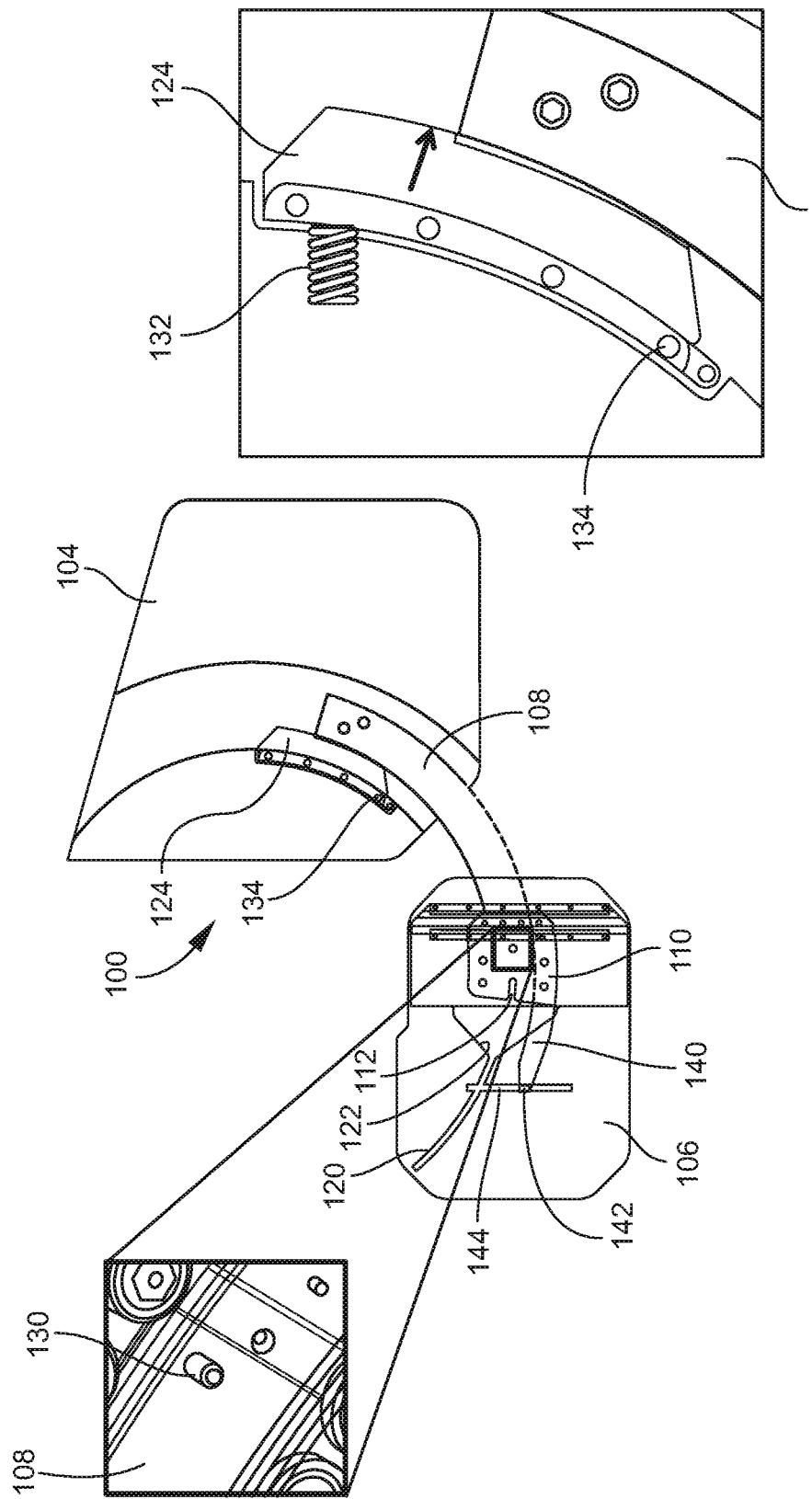

TRAY TABLE ASSEMBLY WITH AUTOMATIC CENTERING DURING STOWAGE

RELATED APPLICATION AND INCORPORATION BY REFERENCE

This application claims priority from U.S. Provisional Application No. 62/478,731 filed Mar. 30, 2017, the entirety of which is incorporated by reference herein.

BACKGROUND

The inventive concepts disclosed herein relate generally to a tray table assembly used in an aircraft passenger seating unit, and particularly a seating unit that provides stowage of the tray table in proximity to one side of the seat. The tray table may be positioned in a stowage module under the armrest when stowed, and may be deployed by pivoting the tray table from the stowage module into a deployed position in front of the passenger. In the deployed position the tray table may be translated fore or aft, as desired.

The ability to translate the tray table fore and aft when deployed presents the problem of the tray table not being centered as necessary in order to enter the opening to the stowage module when the passenger desires to move the tray table back into the stowage module. In a non-centered position the tray table can hit and damage the stowage module or surrounding furniture as the tray table moved towards the stowed position. Any such impact can cause unsightly scratches that detract from the appearance of the seating unit, and repeated such impacts can cause sufficient damage to require the seating unit to be taken out of service for repair or part replacement.

For this reason, it is desirable to provide an automatic stowage feature that centers the tray table in relation to an entrance to the stowage module so that the tray table enters the stowage module smoothly and without manual adjustment of the position thereof by the seat occupant.

SUMMARY

In one aspect, embodiments of the inventive concepts disclosed herein are directed to a mechanism for automatically centering a tray table along an arcuate rail the tray table is returned into a respective stowage module, thus preventing the tray table from hitting and damaging the surrounding furniture or module during a stowage procedure.

In a further aspect, the mechanism incorporates a funnel-shaped feature disposed on a bottom of the tray table and a roller bearing pin on a top of the arced rail on which the tray table sits. As the tray table is moved toward the stowed position, the roller bearing pin on the arced rail comes into contact with walls of the funnel-shaped feature on the bottom of the tray table that guide the tray table to a predetermined centered position over the rail via tray table linear motion hardware, thus positioning the tray table to enter the stowage module without impacting surrounding surfaces. The shape of the funnel feature may be configured to capture the roller bearing on the arced rail from any position of the tray table regardless of the linear fore/aft travel at the deployed position.

In a further aspect, the tray table may be movable between a deployed position and a stowed position with respect to a tray table storage module without damage to the tray table and components in proximity to the storage module.

In a further aspect, the tray table may be equipped with an automatic stowage feature configured to center the tray table in relation to an entrance to a stowage module such that the tray table can be returned to the stowage module smoothly and without manual adjustment of a position of the tray table.

In a further aspect, the tray table may be automatically centered with respect to an arcuate rail when the tray table is returned to the tray table stowage module.

In a further aspect, the tray table centering mechanism may include a funnel-shaped feature disposed on a bottom of the tray table and a roller bearing pin on a top of the arcuate rail on which the tray table sits to center the tray table on the roller bearing pin as the tray table is moved in a direction of the stowage module.

In a further aspect, the tray table assembly is configured to move to and from a stowed position within a stowage module positioned to one side of a passenger seating unit, and a deployed position outside of the stowage module and in front of the passenger seating unit, for example, forward of a seated passenger. The assembly may include an arcuate rail mounted in the stowage module for movement between a stowed position and a deployed position, with the tray table mounted on the rail for arcuate movement along the rail between the stowed position and the deployed position relative to the rail, and also mounted on the rail for fore and aft translating movement in the deployed position. A channel may be positioned on a carriage mounted on an underside of the tray table and movable with the tray table in the fore and aft translating movement. The channel may have an arcuate segment defining a curve corresponding to a curve of the rail and a funnel-shaped centering segment communicating with the arcuate segment of the channel. The rail may include at least one roller pin fixed in a position representing a centered position for the tray table to assume before entering the stowage module. As the tray table moves in a direction of the stowage module, the roller pin moves along the arcuate segment of the channel and contacts the funnel-shaped centering segment. As the funnel-shaped channel engages and moves relative to the roller pin, the roller pin centers the tray table relative to the stowage module such that the tray table enters the stowage module without impacting surrounding surfaces of the seating unit.

In a further aspect, the rail may include a rail latch positioned adjacent the carriage for being moved by the carriage to an open position as the carriage moves towards the stowed position and a latch detent positioned to catch on an end of the rail for locking the tray table in a locked, stowed position when the rail reaches the fully stowed position.

In a further aspect, the rail may be mounted on a pivot adjacent one end of the rail whereby the rail is enabled to pivot into and out of a locked position thereof.

In a further aspect, the rail latch may be biased by a biasing member toward a locked position.

In a further aspect, a guide arm may be carried by the rail and extend toward a deployed position of the tray table. A guide pin may be mounted on the guide arm positioned to ride in a guide slot positioned in a bottom surface of the tray table. The guide slot may be angled in relation to the tray table to permit translating fore and aft movement of the tray table when in a deployed position of the tray table.

In a further aspect, the guide slot and the channel may intersect.

In another aspect, embodiments of the inventive concepts disclosed herein are directed to a tray table adapted to deploy from within a stowage module positioned relative to a passenger seat, the tray table assembly including an auto-centering mechanism for returning the tray table to a predetermined centered position during stowing the tray table within the stowage module.

Embodiments of the inventive concepts can include one or more or any combination of the above aspects, features and configurations.

BRIEF DESCRIPTION OF THE DRAWINGS

Implementations of the disclosed inventive concepts are better understood when consideration is given to the following detailed description. The description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2 is a schematic bottom plan view of an armrest and stowed tray table;

FIG. 3 is a schematic bottom plan view showing the tray table partially deployed, with an enlarged view of a roller ball pin;

FIG. 5 is a schematic bottom plan view showing the tray table partially deployed and in an off-center position;

FIG. 6 is a schematic bottom plan view showing the tray table partially deployed and in a centered position;

FIG. 8 is a schematic bottom plan view showing the tray table deployed and a rail in a latched position; and FIG. 9 is a fragmentary enlarged view of the rail latch of FIG. 8.

DETAILED DESCRIPTION OF EXEMPLARY EMBODIMENTS

The inventive concepts are described with reference to the accompanying drawings in which exemplary embodiments are shown. However, the inventive concepts may be embodied in many different forms and should not be construed as limited to the representative embodiments set forth herein.

The inventive concepts disclosed herein are generally directed to a tray table and a mechanism for automatically centering the tray table along an arcuate rail during stowage to ensure proper alignment of the tray table during stowing such that the tray table is returned into a respective stowage module while preventing the tray table from hitting and damaging the surrounding furniture or module during the stowage procedure.

Figure 1:
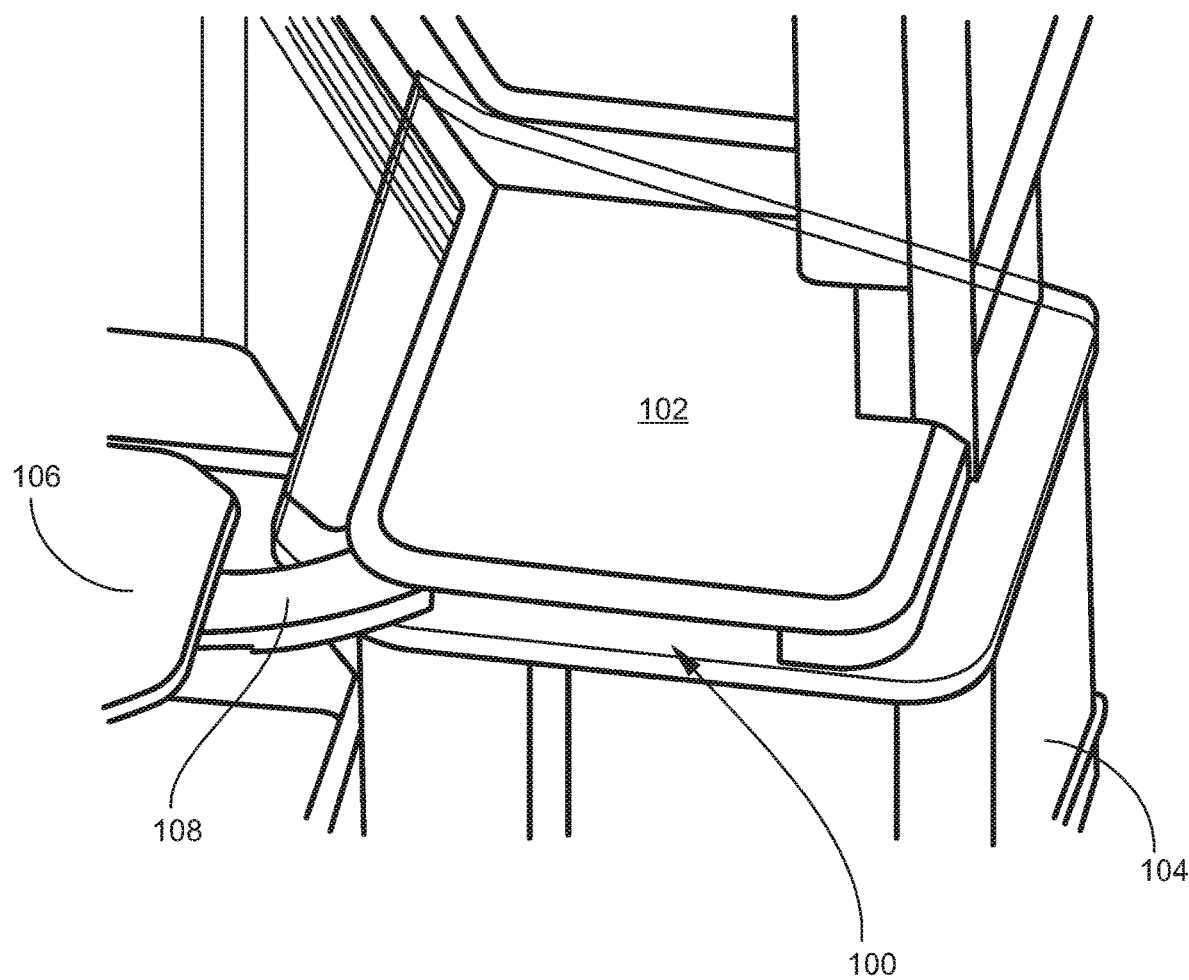
FIG. 1 is a fragmentary perspective view of a tray table assembly, including an armrest table surface, showing a tray table in a deployed position thereof.

Referring now to the drawings, an exemplary embodiment of a tray table stowage module 100 and armrest 102 are shown in FIG. 1. The stowage module 100 is positioned on a seating unit module 104, for example, adapted to be positioned to one side of an aircraft passenger seat. A tray table 106 is mounted on an arcuate rail 108 and is configured to move between a stowed position within or beneath the stowage module 100, as shown in FIG. 2, and a deployed position outside of the stowage module 100, as shown in FIG. 8. For example, the tray table 106 deploys to a use position outside of the stowage module 100, perpendicular to the stowage module 100, and forward of a passenger seated in the passenger seat.

Referring to FIG. 2, the arcuate rail 108 is mounted on bearings in the stowage module 100 and includes a carriage 110 having a roller pin slot 112. As best shown in FIG. 3, the roller pin slot 112 is sized to contain three roller bearing pins 114. To deploy the tray table 106, the tray table 106 can be released from a fully stowed position in the stowage module 100 by grasping the exposed end of the tray table 106 and manually withdrawing it, or alternatively, automating tray table deployment by way of any number of conventional mechanisms. The tray table 106 moves deploys following an arcuate path out of the stowage module 100. When the carriage 110 bottoms out on the roller bearing pins 114 the rail 108 begins to exit the stowage module 100 as well, as best shown in FIG. 3.

Figure 4:
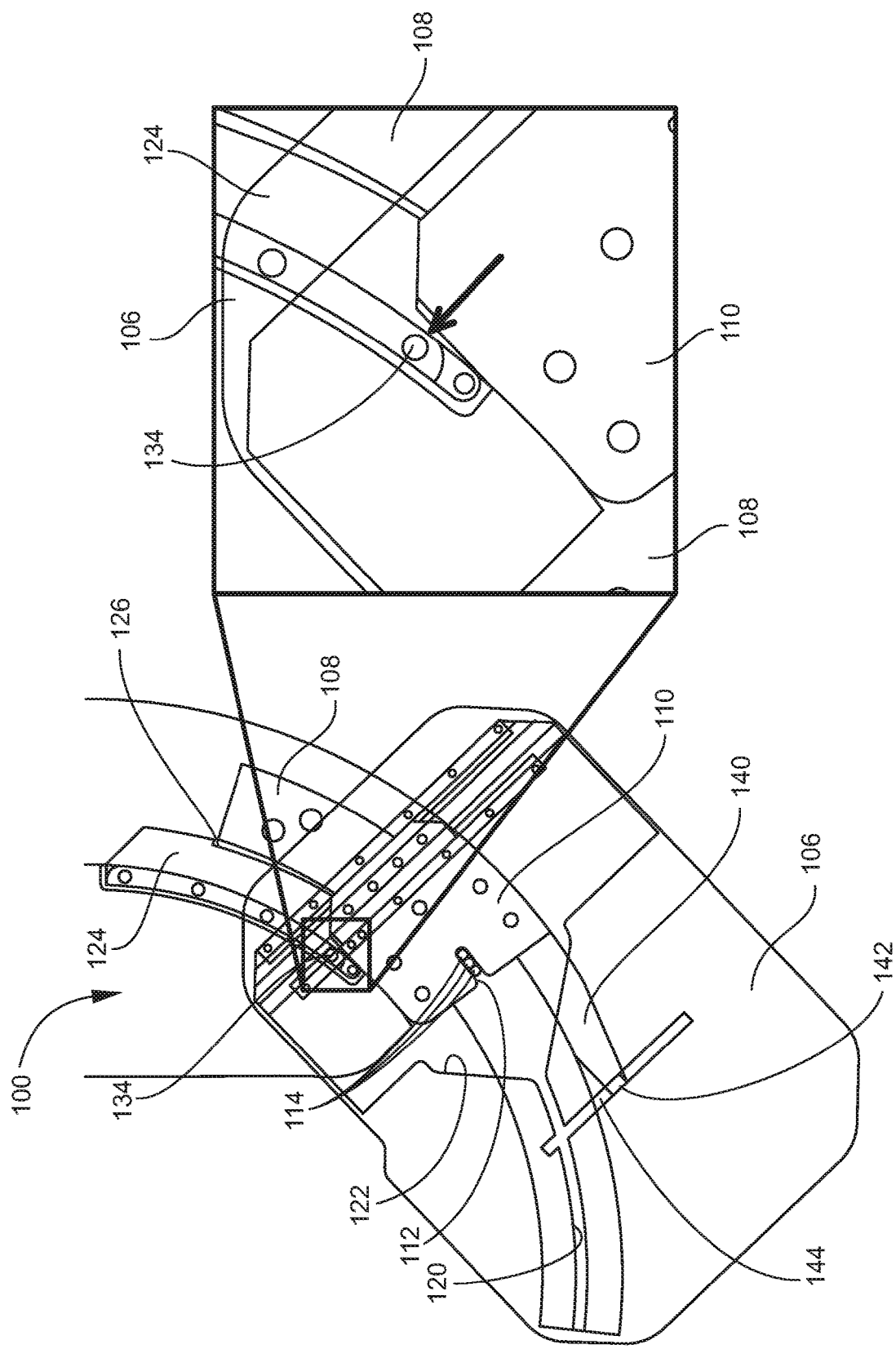
FIG. 4 is a schematic bottom plan view showing the tray table partially stowed, with an enlarged view of a rail latch.

As shown in FIG. 4, the underside of the tray table 106 includes an arcuate channel 120 that includes a funnel-shaped segment 122. A rail latch 124 is driven open by the carriage 110 so that the rail 108 can begin to move with the tray table 106 back into the stowed position. The rail latch 124 includes a detent 126 positioned to catch on the end of the rail 108, latching the tray table 106 in the stowed position.

Centering of the tray table 106 before stowage is necessary due to the extent of freedom of motion permitted to the tray table 106 when deployed. In the deployed position, the tray table 106 can translate fore and aft in both directions a predetermined amount, for example, about by 5-10 cm, more preferably about 7-8 cm. Thus, the tray table 106 can be nominally off-center with respect to the rail 108 at any point when initiating the stowage procedure.

Figure 7:
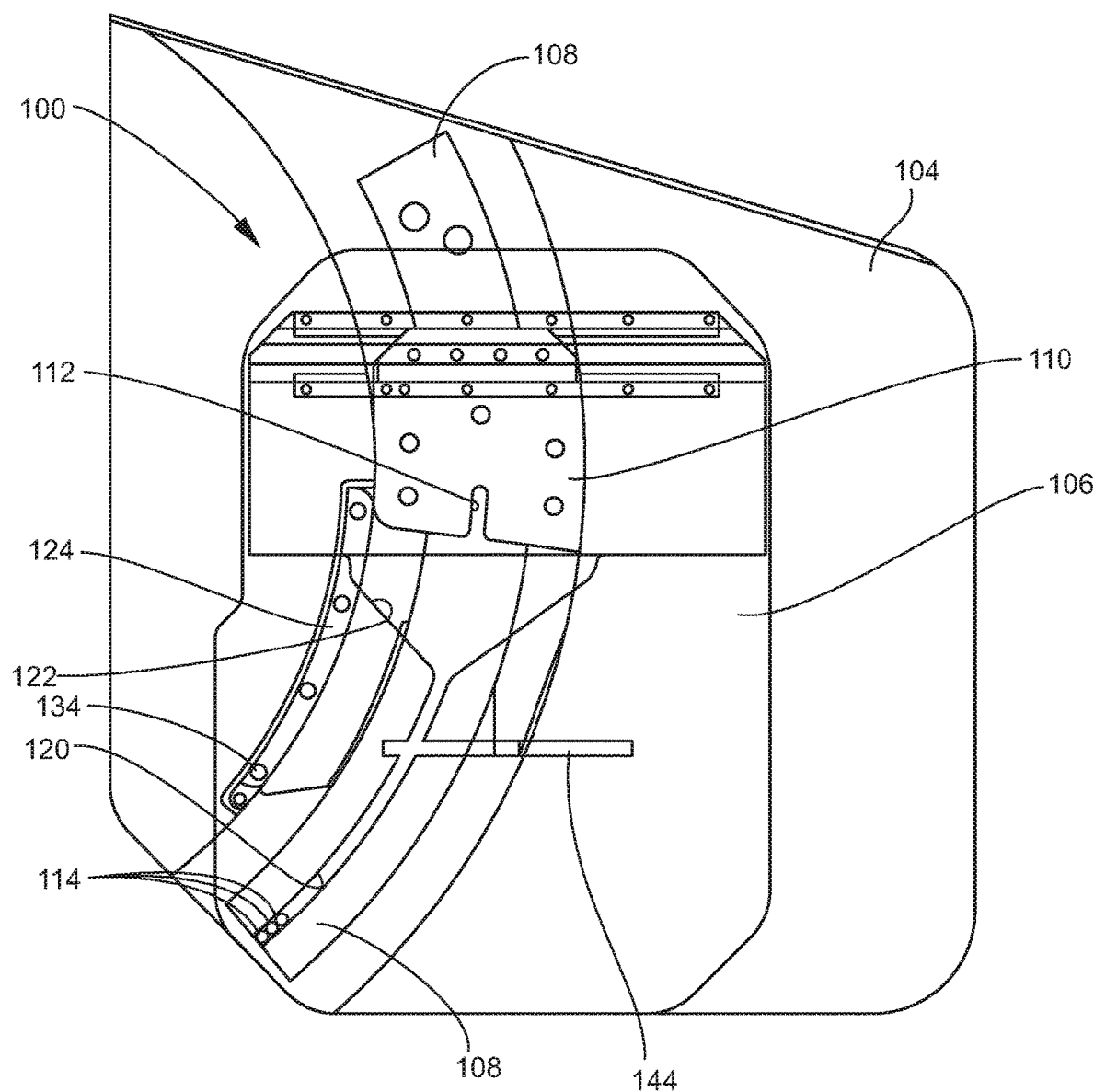
FIG. 7 is a schematic bottom plan view showing the tray table fully stowed in a stowage module.

The funnel-shaped segment 122 of the channel 120 allows the user to stow the tray table 106 from any position without the need to first return the tray table to a predetermined "centered" position with respect to the rail 108. As the tray table 106 is initially moved from the fully deployed position thereof, as shown in FIG. 8, the tray table 106 must first be "centered." Centering occurs as the tray table 106 is moved to the stowed position. The roller bearing pins 114 are first moved into the roller pin slot 112, which dictates the predetermined correct centered position of the tray table 106 relative to the rail 108 and the stowage module 100. By comparing FIGS. 5 and 6, it can be seen that as the tray table 106 moves toward the stowed position thereof the roller pins 114 have moved progressively along the sloped wall of the funnel shaped segment 122. Because the roller pins 114 are fixed in the centered position defined by the roller pin slot 112, the tray table 106 translates progressively to the centered position as it moves toward the stowage module 100. FIG. 7 illustrates that in the fully stowed position of the tray table 106 the roller pins 114 have moved the entire length of the channel 120 and the tray table 106 is properly centered on the rail 108, as required for proper alignment for stowage.

Referring to FIG. 8, the tray table 106 in the fully deployed position thereof may be hold or otherwise maintained in fully deployed position by a detent 130, for example, a spring-loaded ball. As also shown in FIG. 8, the rail latch 124 locks the rail 108 into place as the tray table 106 is fully extended on the rail 108 and deployed for use.

As shown in FIG. 9, the rail latch 124 is biased by a spring 132 toward a locked position of the rail latch 124. Thus, when the tray table 106 is fully deployed and the rail 108 is fully extended, the rail latch 124 catches the back of the rail 108 to lock the rail 108 in the deployed state thereof. The rail latch 124 is mounted at one end on a pivot 134 to permit the rail latch 124 to move into and out of the latched position. To stow the tray table 106, the carriage 110 presses against the pivotally-mounted end of the rail latch 124, as shown in FIG. 4, which forces the rail latch 124 out of engagement with the rail 108, allowing the rail 108 to move past the rail latch 124 and into the stowed position.

Translation of the tray table 106 is accomplished by a guide arm 140 that extends outwardly from the tray table end of the rail 108. A guide pin 142 on the end of the guide arm 140 rides in a guide slot 144 that intersects the channel 120 and permits the seat occupant to move the tray table 106 fore or aft, as desired.

A tray table with automatic centering during stowage according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments may perform similar functions and/or achieve similar results. Any and all such equivalent embodiments and examples are within the scope of the present invention and are intended to be covered by the appended claims.

What is claimed is:

1. A tray table assembly adapted to deploy from a stowage module, comprising:
    a rail mountable to a stowage module and movable between a stowed position and a deployed position of the rail relative to a stowage module;
    a tray table mounted on the rail for arcuate movement along the rail between a stowed position and a deployed position of the tray table relative to the rail;
    a channel disposed on an underside of the tray table and movable with the tray table, the channel comprising an arcuate segment defining a curve corresponding to a curve of the rail and a funnel-shaped centering segment communicating with the arcuate segment of the channel; and
    at least one roller pin fixed in a predetermined position on the rail representing a centered position for the tray table to assume before entering a stowage module, wherein as the tray table moves toward a stowage module the roller pin moves along the arcuate segment of the channel and contacts the funnel-shaped centering segment, and as the funnel-shaped channel engages and moves relative to the roller pin the roller pin centers the tray table relative to the rail such that the tray table enters a stowage module in a predetermined centered position.

2. The tray table of claim 1, wherein the rail comprises a rail latch disposed adjacent a carriage for being moved by the carriage to an open position as the carriage moves towards the stowed position of the tray table, and a latch detent arranged to catch an end of the rail to lock the tray table in the stowed position of the tray table when the rail reaches the stowed position of the rail.

3. The tray table of claim 2, wherein the rail latch is mounted on a pivot adjacent one end of the rail such that the rail latch is enabled to pivot into and out of a locked position of the rail.

4. The tray table of claim 3, wherein the rail latch is biased toward a locked position of the rail.

5. The tray table of claim 1, further comprising:
    a guide arm carried by the rail and extending towards the deployed position of the tray table; and
    a guide pin mounted on the guide arm and positioned to travel in a guide slot positioned in a bottom surface of the tray table, the guide slot being angled in relation to the tray table.

6. The tray table of claim 5, wherein the guide slot and the channel intersect.

7. A tray table assembly adapted to move to and from a stowed position with respect to a stowage module positionable to one side of a passenger seat, comprising:
    a rail movably mounted relative to a stowage module between a stowed position of the rail and a deployed position of the rail, the rail comprising a rail latch disposed adjacent the rail for being moved by the rail to an open position as the rail moves towards the stowed position of the rail, and a latch detent positioned to catch an end of the rail to lock the tray table in a stowed position of the tray table when the rail reaches the stowed position of the rail;
    a tray table mounted on the rail for arcuate movement along the rail between a stowed position of the tray table and a deployed position of the tray table relative to the rail;
    a channel disposed on an underside of the tray table and movable with the tray table, the channel having an arcuate segment defining a curve corresponding to a curve of the rail and a funnel-shaped centering segment communicating with the arcuate segment of the channel; and
    at least one roller pin fixed in a position on the rail representing a centered position for the tray table to assume before entering a stowage module, wherein as the tray table moves toward a stowage module the roller pin moves along the arcuate segment of the of the channel and contacts the funnel-shaped centering segment, and as the funnel-shaped channel engages and moves relative to the roller pin, the roller pin centers the tray table relative to a stowage module for predetermined centered alignment for stowing the tray table.

8. The tray table of claim 7, wherein the rail latch is mounted on a pivot adjacent one end of the rail such that the rail latch is enabled to pivot into and out of its locked position.

9. The tray table of claim 7, wherein the rail latch is biased by a biasing member toward a locked position of the rail.

10. The tray table of claim 7, further comprising:
    a guide arm carried by the rail and extending toward the deployed position of the tray table; and
    a guide pin mounted on the guide arm and positioned to travel along a guide slot positioned in a bottom surface of the tray table, the guide slot being angled in relation to the tray table.

11. A tray table assembly combined with a stowage module, the tray table assembly adapted to move to and from a stowed position in the stowage module, the stowage module positionable to one side of a passenger seating unit, and a deployed position outside of the stowage module and positionable forward of a passenger seat, the tray table assembly and stowage module combination comprising:
    an arcuate rail mounted in the stowage module for movement between a stowed position and a deployed position of the rail, the rail comprising a rail latch positioned adjacent a carriage for being moved by the carriage to an open position as the carriage moves toward the stowed position of the rail and a latch detent positioned to catch on an end of the rail for locking a tray table in a stowed position of the tray table when the rail reaches a fully stowed position;

the tray table mounted on the rail for arcuate movement along the rail between a stowed position and a deployed position of the tray table relative to the rail;

a channel positioned on an underside of the tray table and movable with the tray table, the channel having an arcuate segment defining a curve corresponding to a curve of the rail and a funnel-shaped centering segment communicating with the arcuate segment of the channel; and a plurality of adjacent and radially-aligned roller bearing pins fixed in a position along the rail representing a centered position for the tray table to assume before entering the stowage module.

12. The tray table of claim 11, wherein the rail includes a rail latch positioned adjacent the carriage for being moved by the carriage to an open position as the carriage moves towards the stowed position of the tray table and a latch detent positioned to catch on an end of the rail for locking the tray table in the stowed position of the tray table when the rail reaches the stowed position of the rail.

13. The tray table of claim 12, wherein the rail latch is pivotally mounted adjacent one end of the rail such that the rail latch is enabled to pivot into and out of a locked position.

14. The tray table of claim 13, wherein the rail latch is biased by a biasing member toward the locked position.

15. The tray table of claim 11, further comprising:

a guide arm carried by the rail and extending towards the deployed position of the tray table; and a guide pin mounted on the guide arm and positioned to ride in a guide slot positioned in a bottom surface of the tray table, the guide slot being angled in relation to the tray table.

16. The tray table of claim 15, wherein the guide slot and the channel intersect.

17. The tray table of claim 11, further comprising a detent carried by the carriage configured to maintain the tray table in the deployed position of the tray table.

18. The tray table according to claim 11, wherein the rail intersects the tray table on a side of the tray table adjacent the stowage module.

19. The tray table according to claim 11, wherein the stowage module comprises a base and a vertically spaced-apart top defining a stowage opening in which the tray table resides in the stowed position of the tray table.

* * * * *